US010465787B2

(12) United States Patent
Chen et al.

(10) Patent No.: US 10,465,787 B2
(45) Date of Patent: Nov. 5, 2019

(54) VARIABLE-RATIO LINE GEAR MECHANISM

(71) Applicant: SOUTH CHINA UNIVERSITY OF TECHNOLOGY, Guangdong (CN)

(72) Inventors: Yangzhi Chen, Guangdong (CN); Huai Huang, Guangdong (CN); Yueling Lv, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 222 days.

(21) Appl. No.: 15/527,015

(22) PCT Filed: Dec. 31, 2015

(86) PCT No.: PCT/CN2015/100289
§ 371 (c)(1),
(2) Date: May 16, 2017

(87) PCT Pub. No.: WO2017/024749
PCT Pub. Date: Feb. 16, 2017

(65) Prior Publication Data
US 2017/0343095 A1    Nov. 30, 2017

(30) Foreign Application Priority Data
Aug. 13, 2015 (CN) .......................... 2015 1 0497584

(51) Int. Cl.
*F16H 55/08* (2006.01)
*F16H 35/02* (2006.01)
(Continued)

(52) U.S. Cl.
CPC ............... *F16H 55/08* (2013.01); *F16H 3/42* (2013.01); *F16H 35/02* (2013.01); *F16H 2057/0087* (2013.01)

(58) Field of Classification Search
CPC . F16H 3/42; F16H 3/423; F16H 3/426; F16H 55/10; F16H 35/02
See application file for complete search history.

(56) References Cited

U.S. PATENT DOCUMENTS

2,585,971 A * 2/1952 Sloane ...................... F16H 1/04
74/393
3,178,959 A * 4/1965 Schwesinger ........... F16H 35/02
74/393
(Continued)

*Primary Examiner* — Terence Boes
(74) *Attorney, Agent, or Firm* — Adam Warwick Bell; Matthew Rupert Kaser (57) ABSTRACT

The present invention is a variable-ratio line gear mechanism. The mechanism forms a transmission pair consisting of a driving line gear and a driven line gear, of which axes intersect at an arbitrary angle. Transmission is generated by point contact meshing movement of line teeth between the driving line gear and the driven line gear. A contact curve of the line tooth is designed in accordance with space conjugate curve meshing theory, and the designing equation is divided into an equal transmission ratio part and a variable transmission ratio part. The equal transmission ratio part provides a uniform transmission, and the variable transmission ratio part makes the transmission ratio smoothly transit. The line gear mechanism is able to provide periodically transmission with variable transmission ratio, to provide a plurality of transmission ratios during a movement period of the driven line gear, and to enable smooth transitions between respective transmission ratios in accordance with movement rules.

2 Claims, 3 Drawing Sheets

(51) Int. Cl.
    *F16H 3/42*      (2006.01)
    *F16H 57/00*     (2012.01)
    *F16H 55/10*     (2006.01)

(56) References Cited

U.S. PATENT DOCUMENTS

| | | | | |
|---|---|---|---|---|
| 4,326,431 | A | * | 4/1982 | Stephenson ............. F16H 3/426 74/397 |
| 5,170,677 | A | * | 12/1992 | Yonekura ................ F16H 35/02 74/393 |
| 5,222,405 | A | * | 6/1993 | Reynolds ................ F16H 3/426 74/351 |
| 5,251,507 | A | | 10/1993 | Takahara et al. |
| 2011/0132117 | A1 | * | 6/2011 | Yaeger .................... F16H 3/426 74/412 R |

* cited by examiner

VARIABLE-RATIO LINE GEAR MECHANISM

TECHNICAL FIELD

The present invention relates to the field of mechanical transmission, in particular, to a line gear mechanism meshing on a basis of space conjugate curve meshing theory and able to provide periodically variable transmission ratio.

BACKGROUND

In gearing-up or gearing-down between two axes, a gear able to realize a variable transmission velocity ratio is called the variable-ratio gear. The variable-ratio gear is mainly used in transmission occasions with special requirements, for example, in aspects of stepless speed regulation in automobile, oval gear flowmeter, and manipulator with variable transmission ratio.

A gear often used for transmission with variable transmission ratio is mainly a non-circular gear, since a non-circular gear mechanism may realize a special movement and function operation, such as swing, indexing, and varying speed, and in the meantime, the non-circular gear may be designed according to transmission ratio function. At present, the non-circular gear used for transmission with variable speed ratio refers to a non-cylindrical gear, and a non-bevel gear. Elliptic bevel gear is a typical non-bevel gear, in named for its large end node being a spherical ellipse. Orthogonal non-circular surface gear pair is a new-style variable-ratio gear transmission, and it has advantages of the non-circular gear, non-bevel gear and face gear, with its design and processing being more simple than the non-circular gear with variable transmission ratio. In addition, variable transmission ratio may be realized by a planetary gear set. Continuous variable magnetic gear comprises a three-phase winding stator and three concentric rotors. By controlling the speed of a central rotor, the transmission ratio between an input rotor and an output rotor can vary.

Line gear is a new-type gear utilizing a space curve meshing theory in the place of a traditional space curve surface meshing theory, which is mainly applied to micro transmission field, and has advantages such as small dimension, large transmission ratio, and easy manufacturing. At present, the line gear pair can be applied to transmissions on two vertical axes, two intersecting axes and two skewed axes, and its researches such as design equation, contact ratio, strength criterion, micro transmission and manufacturing field have tended to be perfect.

In a micro mechanical device with limited dimension, sometimes there is complicated transmission requirement of periodically variable transmission ratio, which is hard to realize by controlling, while traditional non-circular gear is not suitable for micro dimension.

SUMMARY OF THE INVENTION

Based on the theory of a line gear, the present invention provides a solution for designing a variable-ratio line gear mechanism. A line gear pair mechanism designed by this solution may provide a transmission with periodically variable transmission ratio.

The technical solution adopted in the present invention is as follows.

A variable-ratio line gear mechanism forms a transmission pair consisting of a driving line gear and a driven line gear, of which axes intersect at an arbitrary angle. The driving line gear consists of a wheel body and line teeth, and the driven line gear consists of a wheel body and line teeth. Contact curves of the line tooth of the driving line gear and the line tooth of the driven line gear mesh in accordance with a pair of spatial conjugate curves. The driving line gear is connected with an actuator to provide an input. There are one or more line teeth on the driving line gear. The line tooth of the driving line gear meshes with the line tooth of the driven line gear by point contact. The driven line gear is connected with an output end to provide a movement or an output of force. The line tooth on the driven line gear is the one with property of variable transmission ratio. In one movement period, a plurality of transmission ratios exist, and a smooth transition among different transmission ratios can be made, resulting in a transmission with periodically variable transmission ratio.

In the above-described variable-ratio line gear mechanism, the contact curve on the line tooth of the driving line gear for meshing is a circular helix. The line tooth of the driven line gear is divided into an equal transmission ratio part and a variable transmission ratio part. There are two equations for the contact curves on the line tooth for meshing: one is an equal transmission ratio equation for realizing equal transmission ratio, and the other one is a variable transmission ratio equation for realizing variable transmission ratio.

During the transmission of the above-described variable-ratio line gear mechanism, the variable transmission ratio equation can make the transmission ratio of the line gear smoothly change from one value to another, i.e. a derivative value of transmission ratio function increases or decreases from 0 to a certain value, and then smoothly back to 0.

During the transmission of the above-described variable-ratio line gear mechanism, in order to reduce the rotation and jumpiness of the operation of said mechanism, derivatives of both the variable transmission ratio equation and the variable transmission ratio equation can transit smoothly, i.e. derivative and second derivative of the variable transmission ratio equation both increase or decrease from 0 to a certain value, and then smoothly back to 0.

Accordingly, in the above-described variable-ratio line gear mechanism, O–xyz is a Cartesian coordinate system that is arbitrarily fixed in space, wherein O is an origin of the coordinate system O–xyz, and x, y, z are three coordinate axes of the coordinate system O–xyz. A Cartesian coordinate system $O_p$–$x_p y_p z_p$ is determined in accordance with a position of the coordinate system O–xyz, wherein a plane $x_p O_p z_p$ is in a same plane as a plane xOz, a distance from a coordinate origin $O_p$ to the axis z is a, a distance from $O_p$ to the axis x is b, and an angle between the axis z and an axis $z_p$ is $(\pi-\theta)$. $\theta$ is an angle between angular velocity vectors of the driving and driven line gears, with $0°\leq\theta\leq180°$. Coordinate systems $O_1$–$x_1 y_1 z_1$ and $O_2$–$x_2 y_2 z_2$ are respectively the coordinate systems fixed on the driving line gear and the driven line gear. During transmission, the driving line gear and driven line gear rotate around the axis z and the axis $z_p$, respectively, and an initial meshing place of the driving line gear and the driven line gear is an initial position. At the initial position, coordinate systems $O$–$x_1 y_1 z_1$ and $O_2$–$x_2 y_2 z_2$ coincide with the coordinate systems $O$–xyz and $O_p$–$x_p y_p z_p$ respectively. At any time, the origin $O_1$ coincides with O, an axis $z_1$ coincides with the axis z, the origin $O_2$ coincides with $O_p$, an axis $z_2$ coincides with the axis $z_p$, the driving line gear rotates around the axis z at a uniform angular velocity $\omega_1$, angular velocity direction of the driving line gear is a negative direction of the axis z, and an angle that the driving line gear rotates through around the axis z is $\varphi_1$; the driven line gear rotates around the axis $z_p$ at a uniform angular velocity $\omega_2$, angular velocity direction of the driven line gear is a negative direction of the axis $z_p$, an angle that the driven line gear rotates through around the axis $z_p$ is $\varphi_2$, then an equation of the contact curve for the driving line gear is as follows in the coordinate system $O-x_1y_1z_1$:

$$\begin{cases} x_M^{(1)} = m\cos t \\ y_M^{(1)} = m\sin t \\ z_M^{(1)} = n\pi + nt \end{cases} \left(-\pi \le t \le -\frac{\pi}{2}\right),$$

and then said variable transmission ratio equation is determined by the following two methods:

1) The variable transmission ratio equation smoothly transits, with an equation for its variable transmission ratio contact curve being as follows:

$$\begin{cases} x_M^{(2)} = [(m-a)\cos\theta - (n\pi + nt - b)\sin\theta]\cos\varphi_2 \\ y_M^{(2)} = -[(m-a)\cos\theta - (n\pi + nt - b)\sin\theta]\sin\varphi_2 \\ z_M^{(2)} = -(m-a)\sin\theta - (n\pi + nt - b)\cos\theta \\ \varphi_2 = -\frac{A(\varphi_b - \varphi_a)^2}{\pi^2}\sin\frac{\pi(\varphi_1 - \varphi_a)}{\varphi_b - \varphi_a} + C\varphi_1 \end{cases}$$

wherein, A and C are determined by equations $$\frac{d\varphi_2(\varphi_a)}{d\varphi_1} = \frac{1}{i_a} \text{ and } \frac{d\varphi_2(\varphi_b)}{d\varphi_1} = \frac{1}{i_b},$$

m is a helical radius of the contact curve of the driving line gear, n is a parameter of the contact curve of the driving line gear related to a pitch, with $$n = \frac{p}{2\pi}$$

being defined if the pitch is p, and t is a parameter, with $$-\pi \le t \le -\frac{\pi}{2}$$

representing that the contact curve of one line tooth of the driving line gear is a helix of ¼ circumference. When $t=-\pi$, the line teeth of the driving line gear and driven line gear begin to mesh. When $$t = -\frac{\pi}{2},$$

the driving line gear rotates through ¼ circumference, and the line teeth of the driving line gear and driven line gear mesh to an end and begin to demesh. $i_a$ and $i_b$ are respectively the transmission ratio before and after some period of change process; $\varphi_a$ and $\varphi_b$ are respectively a start angle and an end angle of some line tooth of the driving line gear during transmission in a variable transmission ratio process, for example, when $$-\pi < t < -\frac{\pi}{2}, \varphi_b - \varphi_a = \frac{\pi}{2}.$$

2) Derivatives of the variable transmission ratio equation and variable transmission equation both can smoothly transit, i.e. equation for the variable transmission ratio contact curve is as follows:

$$\begin{cases} x_M^{(2)} = [(m-l_1)\cos\theta - (n\pi + nt - l_2)\sin\theta]\cos\varphi_2 \\ y_M^{(2)} = -[(m-l_1)\cos\theta - (n\pi + nt - l_2)\sin\theta]\sin\varphi_2 \\ z_M^{(2)} = -(m-l_1)\sin\theta - (n\pi + nt - l_2)\cos\theta \\ \varphi_2 = \frac{E(\varphi_b - \varphi_a)^3}{8\pi^3}\cos\frac{\pi(\omega_1 t_1 - \varphi_a)}{\varphi_b - \varphi_a} + \frac{F}{2}(\omega_1 t_1)^2 + G\omega_1 t_1 \\ \varphi_1 = t + \pi \end{cases}$$

Wherein, E, F and G are determined by equations $$\frac{d^2\varphi_2(\varphi_b)}{d\varphi_1^2} = 0, \frac{d\varphi_2(\varphi_a)}{d\varphi_1} = 1/i_a \text{ and } \frac{d\varphi_2(\varphi_b)}{d\varphi_1} = 1/i_b,$$

m is a helical radius of the contact curve of the driving line gear, n is a parameter of the contact curve of the driving line gear related to a pitch, with $$n = \frac{p}{2\pi}$$

being defined if the pitch is p, and t is a parameter, with $$-\pi \le t \le -\frac{\pi}{2}$$

representing that the contact curve of one line tooth of the driving line gear is a helix of ¼ circumference. When $t=-\pi$, the line teeth of the driving line gear and driven line gear begin to mesh. When $$t = -\frac{\pi}{2},$$

the driving line gear rotates through ¼ circumference, and the line teeth of the driving line gear and driven line gear mesh to an end and begin to demesh. $i_a$ and $i_b$ are respectively the transmission ratio before and after some period of change process; $\varphi_a$ and $\varphi_b$ are respectively a start angle and an end angle of some line tooth of the driving line gear during transmission in a variable transmission ratio process, for example, when $$-\pi < t < -\frac{\pi}{2}, \varphi_b - \varphi_a = \frac{\pi}{2}.$$

The variable transmission ratio equations created in accordance with claims 5 and 6 may be used in the variable-ratio line gear mechanism.

The line tooth on the driving line gear obtained in the present mechanism is designed on the basis of a circular helix, and there may be one or more line teeth. The line tooth of the driving line gear meshes with the line tooth of the driven line gear by point contact. The driven line gear is connected with an output end to provide a movement or an output of force. Line tooth on the driven line gear includes multiple designs, and may be designed as the line tooth with property of variable transmission ratio according to different equations for the contact curve on the line gear. In one movement period, a plurality of transmission ratios may exist, and a smooth transition among different transmission ratios can be made.

Principle of the present invention is that: in accordance with space conjugate curve meshing theory of the line gear, contact curve equation of the line tooth of the driven line gear required by transmission with equal transmission ratio can be designed; the contact curve equation of the line tooth of the driven line gear is improved, so that the transmission ratio is a certain value when it begins to enter into meshing, and the transmission ratio becomes another value when demeshing, with the transmission ratio smoothly changing in this period, i.e. a derivative value of transmission ratio function increases or decreases from 0 to a certain value, and then smoothly back to 0, or the derivative value of the variable transmission ratio function and second derivative of the variable transmission ratio function both increase or decrease from 0 to a certain value, and then smoothly back to 0, thereby the contact curve equation of the line tooth of the driven line gear required by the transmission with variable transmission ratio being obtained.

Compared with the prior arts, the present invention has the following advantages:

1. It is able to provide a plurality of transmission ratios during a movement period of the driven line gear, and to enable smooth transitions between respective transmission ratios in accordance with movement rules.

2. The transmission only depends on the point contact between the line tooth of the driving line gear and the line tooth of the driven line gear, so as long as the accuracy of the contact curve is guaranteed, with the design being simple, the processing being convenient and the weight and bulk being smaller than that of a traditional gear with variable transmission ratio, which is more suitable for microminiature mechanical and electrical products.

3. Line tooth number of the driving line gear is at least 1, being able to provide a transmission with greater transmission ratio, and able to design the line gear pair under a condition of axes intersecting at an arbitrary angle.

DETAILED DESCRIPTION OF THE PREFERRED EMBODIMENT

The present invention is further described below in combination with the drawings, but the implementations of the present invention are not limited hereto.

1. A variable-ratio line gear mechanism described in the present invention comprises a driving line gear and a driven line gear. Coordinate systems of the driving line gear and driven line gear, which are shown in FIG. 1, are used for establishing a contact curve equation of a line tooth of the line gear.

Figure 1:
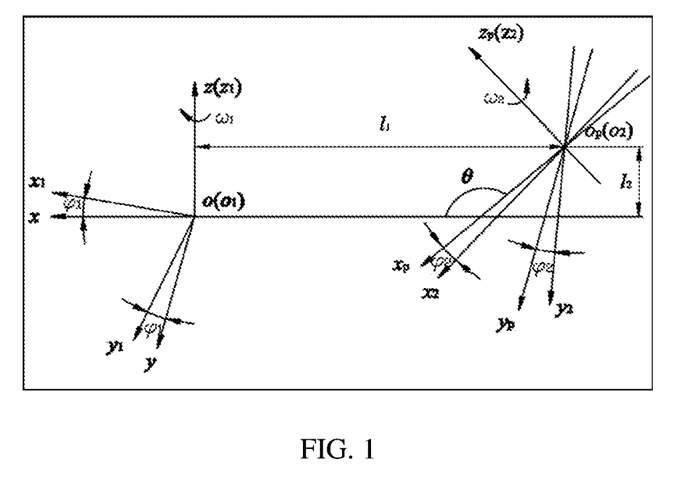
FIG. 1 is the coordinate system of the mechanism according to the present invention.

As shown in FIG. 1, O-xyz and $O_p$-$x_p y_p z_p$ are fixed Cartesian coordinate systems, and $O_p$-$x_p y_p z_p$ is determined in accordance with a position of O-xyz: a plane $x_p O_p z_p$ is in a same plane as a plane xOz, a distance from $O_p$ to the axis z is a, a distance from $O_p$ to the axis x is b, and an angle between the axis z and an axis $z_p$ is $(\pi-\theta)$. $\theta$ is an angle between angular velocity vectors of the driving and driven line gears.

$O_1$-$x_1 y_1 z_1$ and $O_2$-$x_2 y_2 z_2$ are respectively the coordinate systems fixed on the driving line gear and the driven line gear. During transmission, the driving line gear and driven line gear rotate around the axis z and the axis $z_p$, respectively.

Figure 2A:
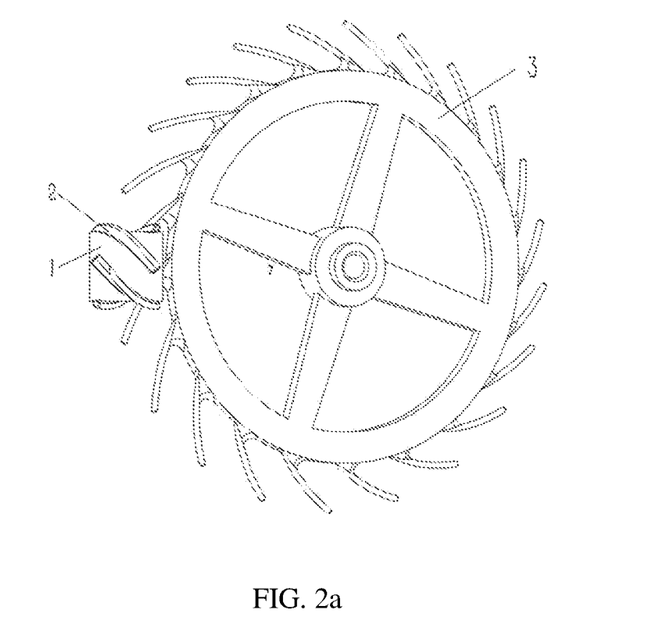
FIG. 2 is two embodiments according to the present invention, including the driving line gear and driven line gear.
Figure 2B:
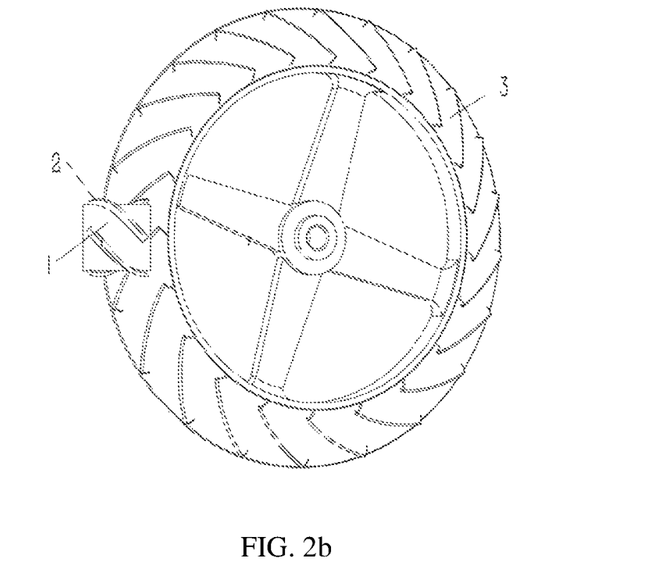

2. The variable-ratio line gear mechanism is shown in FIG. 2a and FIG. 2b. The left one is the driving line gear 1. On the driving line gear, a line tooth 2 of the driving line gear is provided. The right one is the driven line gear 3.

Figure 3:
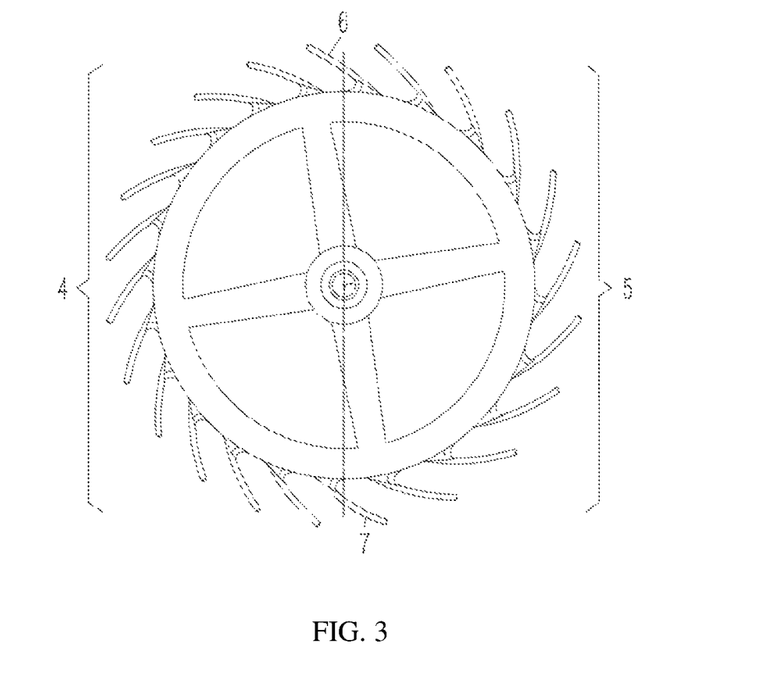
FIG. 3 is the embodiment of the driven line gear according to the present invention.

As shown in FIG. 3, line teeth 4 and 5 with equal transmission ratio and line teeth 6 and 7 with variable transmission ratio are provided on the driven line gear. When the driving line gear and driven line gear mesh to the line teeth 4 and 5 with equal transmission ratio, the transmission ratio is $i_a$ and $i_b$. When they mesh to the line teeth 6 and 7 with variable transmission ratio, the transmission ratios smoothly transits from $i_a$ to $i_b$, and smoothly transits from $i_b$ to $i_a$, respectively. However, the implementations of the present invention are not limited hereto.

An equation designing the above-described line teeth with equal transmission ratio and variable transmission ratio is determined by the following equations.

The line tooth of the driving line gear is determined by its contact curve equation. The equation of the contact curve in $O_1$-$x_1 y_1 z_1$ is:

$$\begin{cases} x_M^{(1)} = m\cos t \\ y_M^{(1)} = m\sin t \\ z_M^{(1)} = n\pi + nt \end{cases} \quad \left(-\pi \leq t \leq -\frac{\pi}{2}\right) \tag{1}$$

The line tooth of the driven line gear is determined by its contact curve equation. The driven contact curve is calculated by the contact curve of the line tooth of the driving line gear and a space curve meshing theory, and its equation in $O_2$-$x_2 y_2 z_2$ is as follows:

When the transmission ratio is i, the contact curve equation on the line tooth with equal transmission ratio is:

$$\begin{cases} x_M^{(2)} = [(m-a)\cos\theta - (n\pi + nt - b)\sin\theta]\cos\left(\frac{t+\pi}{i}\right) \\ y_M^{(2)} = -[(m-a)\cos\theta - (n\pi + nt - b)\sin\theta]\sin\left(\frac{t+\pi}{i}\right) \\ z_M^{(2)} = -(m-a)\sin\theta - (n\pi + nt - b)\cos\theta \end{cases} \tag{2}$$

When the transmission ratio is $i_a$ to $i_b$, there may be two forms of the contact curve equation on the variable-ratio line gear mechanism, one is:

$$\begin{cases} x_M^{(2)} = [(m-a)\cos\theta - (n\pi + nt - b)\sin\theta]\cos\varphi_2 \\ y_M^{(2)} = -[(m-a)\cos\theta - (n\pi + nt - b)\sin\theta]\sin\varphi_2 \\ z_M^{(2)} = -(m-a)\sin\theta - (n\pi + nt - b)\cos\theta \\ \varphi_2 = \frac{A(\varphi_b - \varphi_a)^2}{\pi^2}\sin\frac{\pi(\varphi_1 - \varphi_a)}{\varphi_b - \varphi_a} + C\varphi_1 \end{cases} \quad (3)$$

wherein, A and C is determined by:

$$\frac{d\varphi_2(\varphi_a)}{d\varphi_1} = \frac{1}{i_a} \quad (4)$$

$$\frac{d\varphi_2(\varphi_b)}{d\varphi_1} = \frac{1}{i_b}. \quad (5)$$

The other one is:

$$\begin{cases} x_M^{(2)} = [(m-l_1)\cos\theta - (n\pi + nt - l_2)\sin\theta]\cos\varphi_2 \\ y_M^{(2)} = -[(m-l_1)\cos\theta - (n\pi + nt - l_2)\sin\theta]\sin\varphi_2 \\ z_M^{(2)} = -(m-l_1)\sin\theta - (n\pi + nt - l_2)\cos\theta \\ \varphi_2 = \frac{E(\varphi_b - \varphi_a)^3}{8\pi^3}\cos\frac{\pi(\omega_1 t_1 - \varphi_a)}{\varphi_b - \varphi_a} + \frac{F}{2}(\omega_1 t_1)^2 + G\omega_1 t_1 \\ \varphi_1 = t + \pi \end{cases} \quad (6)$$

wherein, E, F and G are determined by:

$$\frac{d^2\varphi_2(\varphi_b)}{d\varphi_1^2} = 0 \quad (7)$$

$$\frac{d\varphi_2(\varphi_a)}{d\varphi_1} = \frac{1}{i_a} \quad (8)$$

$$\frac{d\varphi_2(\varphi_b)}{d\varphi_1} = \frac{1}{i_b} \quad (9)$$

The physical meaning of each parameter in the equations is as follows:

m is a helical radius of the contact curve of the driving line gear;

n is a parameter of the contact curve of the driving line gear related to a pitch, with $$n = \frac{p}{2\pi}$$

being defined if the pitch is p;

t is a parameter, with $$-\pi \leq t \leq -\frac{\pi}{2}$$

representing that the contact curve of one line tooth of the driving line gear is a helix of ¼ circumference. When t=−π, the line teeth of the driving line gear and driven line gear begin to mesh; when $$t = -\frac{\pi}{2},$$

the driving line gear rotates through ¼ circumference, and the line teeth of the driving line gear and driven line gear mesh to an end and begin to demesh;

a and b are position parameters of the driving line gear and driven line gear, as shown in FIG. 1;

θ is an angle parameter of the driving line gear and driven line gear, as shown in FIG. 1;

$i_a$ and $i_b$ are two transmission ratios which are required;

$\varphi_1$ is a rotation angle of the driving line gear;

$\varphi_2$ is a rotation angle of the driven line gear;

$\varphi_a$ and $\varphi_b$ are respectively a start angle and an end angle of some line tooth of the driving line gear during transmission in a variable transmission ratio process, for example, when $$-\pi < t < -\frac{\pi}{2}, \varphi_b - \varphi_a = \frac{\pi}{2}.$$

Figure 4:
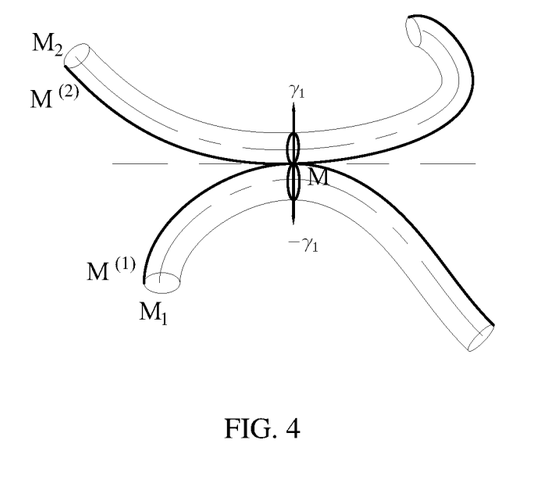
FIG. 4 is the establishment method of the line tooth entity.

3. In accordance with equations (1) to (3), it is possible to establish a line tooth entity. The line tooth entity only needs to meet the strength requirement, and line tooth entity itself does not have any specific shape requirement. As shown in FIG. 4, at each meshing point, a certain bulk is inversely extended respectively at both side ($-\gamma_1$ and $\gamma_1$ in FIG. 4) of the contact direction of the driving and driven line teeth, that the required line teeth can be generated. A wheel body is used to fix and connect the line teeth.

The invention claimed is:

1. A variable-ratio line gear mechanism adapted to form a transmission pair consisting of a driving line gear and a driven line gear, of which axes intersect at an arbitrary angle, the driving line gear consisting of a wheel body and line teeth, the driven line gear consisting of a wheel body and line teeth, contact curves of the line tooth of the driving line gear and the line tooth of the driven line gear meshing in accordance with a pair of space conjugate curves, the driving line gear being connected with an actuator to provide an input, there being one or more line teeth on the driving line gear, the line tooth of the driving line gear being meshed with the line tooth of the driven line gear by point contact, the driven line gear being connected with an output end to provide a movement or an output of force, the line tooth on the driven line gear being the one with property of variable transmission ratio, so that in one movement period, a plurality of transmission ratios exist, and a smooth transition among different transmission ratios can be made, resulting in a transmission with periodically variable transmission ratio, and wherein the contact curve on the line tooth of the driving line gear for meshing is a circular helix, the line tooth of the driven line gear is divided into an equal transmission ratio part and a variable transmission ratio part, and there are two equations for the contact curve on the line tooth for meshing: one is an equal transmission ratio equation for realizing equal transmission ratio, and the other one is a variable transmission ratio equation for realizing variable transmission ratio and wherein, during the transmission of said mechanism, the variable transmission ratio equation can make the transmission ratio of the line gear smoothly change from one value to another, i.e. a derivative value of transmission ratio function increases or decreases from 0 to a certain value, and then smoothly back to 0, and further wherein said variable transmission ratio equation is determined as follows: O−xyz is a Cartesian coordinate system that is arbitrarily fixed in space, O is an origin of the coordinate system O−xyz, x, y, z are three coordinate axes of the coordinate system O−xyz, a Cartesian coordinate system $O_p-x_p y_p z_p$ is determined in accordance with a position of the coordinate system O–xyz, a plane $x_p O_p z_p$ is in a same plane as a plane xOz, a distance from a coordinate origin $O_p$ to the axis z is a, a distance from $O_p$ to the axis x is b, an angle between the axis z and an axis $z_p$ is $(\pi-\theta)$, $\theta$ is an angle between angular velocity vectors of the driving and driven line gears, with $0°\leq\theta\leq180°$, and coordinate systems $O_1-x_1y_1z_1$ and $O_2-x_2y_2z_2$ are respectively the coordinate systems fixed on the driving line gear and the driven line gear; during transmission, the driving line gear and driven line gear rotate around the axis z and the axis $z_p$ respectively, and an initial meshing place of the driving line gear and the driven line gear is an initial position; at the initial position, coordinate systems $O_1-x_1y_1z_1$ and $O_2-x_2y_2z_2$ coincide with the coordinate systems O–xyz and $O_p-x_p y_p z_p$, respectively; at any time, the origin $O_1$ coincides with O, an axis $z_1$ coincides with the axis z, the origin $O_2$ coincides with $O_p$, an axis $z_2$ coincides with the axis $z_p$, the driving line gear rotates around the axis z at a uniform angular velocity $\omega_1$, angular velocity direction of the driving line gear is a negative direction of the axis z, and an angle that the driving line gear rotates through around the axis z is $\varphi_1$; the driven line gear rotates around the axis $z_p$ at a uniform angular velocity $\omega_2$, angular velocity direction of the driven line gear is a negative direction of the axis $z_p$, an angle that the driven line gear rotates through around the axis $z_p$ is $\varphi_2$, then an equation of the driving contact curve is as follows in the coordinate system $O_1-x_1y_1z_1$:

$$\begin{cases} x_M^{(1)} = m\cos t \\ y_M^{(1)} = m\sin t \\ z_M^{(1)} = n\pi + nt \end{cases} \left(-\pi \leq t \leq -\frac{\pi}{2}\right),$$

and then an equation for variable transmission ratio contact curve is:

$$\begin{cases} x_M^{(2)} = [(m-a)\cos\theta - (n\pi+nt-b)\sin\theta]\cos\varphi_2 \\ y_M^{(2)} = -[(m-a)\cos\theta - (n\pi+nt-b)\sin\theta]\sin\varphi_2 \\ z_M^{(2)} = -(m-a)\sin\theta - (n\pi+nt-b)\cos\theta \\ \varphi_2 = -\frac{A(\varphi_b-\varphi_a)^2}{\pi^2}\sin\frac{\pi(\varphi_1-\varphi_a)}{\varphi_b-\varphi_a} + C\varphi_1 \end{cases}$$

wherein, A and C are determined by equations $$\frac{d\varphi_2(\varphi_a)}{d\varphi_1} = \frac{1}{i_a} \text{ and } \frac{d\varphi_2(\varphi_b)}{d\varphi_1} = \frac{1}{i_b},$$

m is a helical radius of the contact curve of the driving line gear, n is a parameter of the contact curve of the driving line gear related to a pitch, with $$n = \frac{p}{2\pi}$$

being defined if the pitch is p, and t is a parameter, with $$-\pi \leq t \leq -\frac{\pi}{2}$$

representing that the contact curve of one line tooth of the driving line gear is a helix of ¼ circumference; when $t=-\pi$, the line teeth of the driving line gear and driven line gear begin to mesh; when $$t = -\frac{\pi}{2},$$

the driving line gear rotates through ¼ circumference, and the line teeth of the driving line gear and driven line gear mesh to an end and begin to demesh; $i_a$ and $i_b$ are respectively the transmission ratio before and after some period of change process; and $\varphi_a$ and $\varphi_b$ are respectively a start angle and an end angle of some line tooth of the driving line gear during transmission in a variable transmission ratio process, for example, when $$-\pi < t < -\frac{\pi}{2}, \varphi_b - \varphi_a = \frac{\pi}{2}.$$

2. A variable-ratio line gear mechanism wherein the contact curve characterized in that, the mechanism forms a transmission pair consisting of a driving line gear and a driven line gear, of which axes intersect at an arbitrary angle, the driving line gear consisting of a wheel body and line teeth, the driven line gear consisting of a wheel body and line teeth, contact curves of the line tooth of the driving line gear and the line tooth of the driven line gear meshing in accordance with a pair of space conjugate curves, the driving line gear being connected with an actuator to provide an input, there being one or more line teeth on the driving line gear, the line tooth of the driving line gear being meshed with the line tooth of the driven line gear by point contact, the driven line gear being connected with an output end to provide a movement or an output of force, the line tooth on the driven line gear being the one with property of variable transmission ratio, so that in one movement period, a plurality of transmission ratios exist, and a smooth transition among different transmission ratios can be made, resulting in a transmission with periodically variable transmission ratio, on the line tooth of the driving line gear for meshing is a circular helix, the line tooth of the driven line gear is divided into an equal transmission ratio part and a variable transmission ratio part, and there are two equations for the contact curve on the line tooth for meshing: one is an equal transmission ratio equation for realizing equal transmission ratio, and the other one is a variable transmission ratio equation for realizing variable transmission ratio, and wherein during the transmission of said mechanism, in order to reduce the rotation and jumpiness of the operation of said mechanism, derivative of the variable transmission ratio equation can also transit smoothly, i.e. second derivative of the variable transmission ratio equation increases or decreases from 0 to a certain value, and then smoothly back to 0, and further wherein said equation for variable transmission ratio contact curve can be expressed as:

$$\begin{cases} x_M^{(2)} = [(m-l_1)\cos\theta - (n\pi+nt-l_2)\sin\theta]\cos\varphi_2 \\ y_M^{(2)} = -[(m-l_1)\cos\theta - (n\pi+nt-l_2)\sin\theta]\sin\varphi_2 \\ z_M^{(2)} = -(m-l_1)\sin\theta - (n\pi+nt-l_2)\cos\theta \\ \varphi_2 = \frac{E(\varphi_b-\varphi_a)^3}{8\pi^3}\cos\frac{\pi(\omega_1 t_1-\varphi_a)}{\varphi_b-\varphi_a} + \frac{F}{2}(\omega_1 t_1)^2 + G\omega_1 t_1 \\ \varphi_1 = t+\pi \end{cases}$$

wherein, E, F and G are determined by equations $$\frac{d^2\varphi_2(\varphi_b)}{d\varphi_1^2} = 0, \frac{d\varphi_2(\varphi_a)}{d\varphi_1} = \frac{1}{i_a}, \text{ and } \frac{d\varphi_2(\varphi_b)}{d\varphi_1} = \frac{1}{i_b},$$

m is a helical radius of the contact curve of the driving line gear, n is a parameter of the contact curve of the driving line gear related to a pitch, with $$n = \frac{p}{2\pi}$$

being defined if the pitch is p, and t is a parameter, with $$-\pi \leq t \leq -\frac{\pi}{2}$$

representing that the contact curve of one line tooth of the driving line gear is a helix of ¼ circumference; when t=−π, the line teeth of the driving line gear and driven line gear begin to mesh; when $$t = -\frac{\pi}{2},$$

the driving line gear rotates through ¼ circumference, and the line teeth of the driving line gear and driven line gear mesh to an end and begin to demesh; $i_a$ and $i_b$ are respectively the transmission ratio before and after some period of change process; $\varphi_a$ and $\varphi_b$ are respectively a start angle and an end angle of some line tooth of the driving line gear during transmission in a variable transmission ratio process, for example, when $$-\pi < t < -\frac{\pi}{2}, \varphi_b - \varphi_a = \frac{\pi}{2};$$

* * * * *